US008363663B2

(12) United States Patent
Smith et al.

(10) Patent No.: US 8,363,663 B2
(45) Date of Patent: Jan. 29, 2013

(54) METHODS AND APPARATUS FOR ROUTING DATA TO NODES

(75) Inventors: Brian James Smith, Seattle, WA (US); Marcelo M. Albuquerque, Issaquah, WA (US); Arun Ayyagari, Seattle, WA (US); Michael A. Dorsett, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 33 days.

(21) Appl. No.: 12/417,065

(22) Filed: Apr. 2, 2009

(65) Prior Publication Data

US 2010/0254395 A1    Oct. 7, 2010

(51) Int. Cl.
    *H04L 12/66*      (2006.01)
(52) U.S. Cl. ........................................ 370/401
(58) Field of Classification Search ............ None
See application file for complete search history.

(56) References Cited

U.S. PATENT DOCUMENTS

| | | | | |
|---|---|---|---|---|
| 5,856,974 | A * | 1/1999 | Gervais et al. | 370/392 |
| 7,082,114 | B1 * | 7/2006 | Engwer et al. | 370/331 |
| 2002/0035624 | A1 * | 3/2002 | Kim | 709/222 |
| 2002/0101870 | A1 * | 8/2002 | Chase et al. | 370/389 |
| 2003/0229603 | A1 * | 12/2003 | Childress et al. | 706/11 |
| 2004/0148398 | A1 * | 7/2004 | Park | 709/227 |
| 2007/0081544 | A1 * | 4/2007 | Sakai et al. | 370/401 |
| 2009/0019143 | A1 * | 1/2009 | Frutiger | 709/223 |
| 2009/0177786 | A1 * | 7/2009 | Takahashi | 709/228 |

FOREIGN PATENT DOCUMENTS

| | | |
|---|---|---|
| EP | 1063820 A1 | 12/2000 |
| EP | 1724976 A1 | 11/2006 |
| JP | 2003188901 A | 7/2003 |

OTHER PUBLICATIONS

Tsirtsis, G.; Network Address Translation—Protocol Translation (NAT-PT); Feb. 2000; The Internet Society; Campio Communications; 20 pages.
Tomicki, L.; NAT-PT Documentation; http://www.lucastomicki.net/naptd.php; 2005; 21 pages.
International Search Report and Written Opinion of PCT/US2010/025825; Jun. 1, 2010; 15 pages.
Albuquerque, M. et al; Global Information Grid (GIG) Edge Network Interface Architecture; Military Communications Conference; Oct. 29, 2007; pp. 1-7; MILCOM 2007; IEEE; Piscataway, NJ.
Fineberg, V.; Beyond Addresses: IPV6 Value for the GIG; Military Communications Conference; Oct. 23, 2006; pp. 1-8; MILCOM 2006; IEEE; Piscataway, NJ.

(Continued)

*Primary Examiner* — Yong Zhou
(74) *Attorney, Agent, or Firm* — Armstrong Teasdale LLP (57) ABSTRACT

A method is described for routing data from a first node to a second node via a gateway. The second node is detected at the gateway, which determines a local identifier of the second node. A name and a global address are associated with the second node. The name and the global address are published to a name service, such that the first node can retrieve the global address based on the name. The gateway receives data from the first node that is addressed to the global address and transmits the data to the second node using the local identifier. The gateway includes software implementing a service-oriented architecture (SOA). Any number of additional services may be added to process messages passing through the gateway.

20 Claims, 5 Drawing Sheets

OTHER PUBLICATIONS

Murphy, S.; Secure Inter-Domain Routing Standards Evolution and Role in the Future GIG; Military Communications Conference; Oct. 29, 2007; pp. 1-7; MILCOM 2007; IEEE; Piscataway, NJ.

Small, S. et al.; Scalable VPNs for the Global Information Grid; Military Communications Conference; Oct. 17, 2005; pp. 1-7; MILCOM 2005; IEEE; Piscataway, NJ.

* cited by examiner

METHODS AND APPARATUS FOR ROUTING DATA TO NODES

BACKGROUND

The field of the disclosure relates generally to routing data to nodes in a global network and, more specifically, to methods and apparatus for automatically establishing the routing of data to nodes as they are detected at local gateways.

Gateway solutions are needed to seamlessly interconnect the global information grid (GIG) with current and future purpose-built networks consisting of Internet Protocol (IP) and non-IP waveforms. The GIG provides command and control features and information sharing to deliver classified and unclassified IP services to key operating locations worldwide. This global network is designed with redundant routes between points to ensure connectivity is not disrupted by a failure at single point. Communication is protected from interception and forgery through the use of High Assurance Internet Protocol Encryption (HAIPE). Architecture and protocol services necessary to make the GIG a robust, highly reliable network carry with them significant network overhead and associated latency.

As implied above, directly connecting tactical devices to the GIG introduces a risk of communication latency between tactical devices in an operating location. This risk is especially pronounced due to the mission-critical and low latency nature of weapons data link applications. Direct connection also increases the effort required to maintain the GIG. When support for a new waveform is required by a tactical device, the entire GIG must be updated to accommodate the new waveform before the tactical device can be brought online. In addition, routing rules must be manually defined and removed as tactical devices are brought online and taken offline.

BRIEF SUMMARY

In one aspect, a method is provided for routing data from a first node to a second node via a gateway. The method includes detecting at the gateway a second node, which is communicatively attached to the gateway, and a local identifier of the second node. The method also includes associating a name and a global network address with the second node. The method further includes publishing the name and the global network address of the second node to a name service from which the first node acquires the global network address based on the name. The method includes receiving data from the first node that is addressed to the global network address and transmitting the data to the second node based on the local identifier.

In another aspect, a global network is provided. The global network includes a first node communicatively attached to a communication medium, an address resolution server communicatively attached to the communication medium, and at least one gateway communicatively attached to the communication medium and comprising a plurality of local communication interfaces. The gateway is programmed to detect a second node and a local identifier of the second node using one of the local communication interfaces. The gateway is further programmed to associate a name and a global network address with the second node and publish an association of the name to the global network address using the address resolution server. The first node acquires the global network address from the address resolution server based on the name. The gateway is also programmed to receive from the first node a remote message addressed to the global network address and transmit the remote message to the second node based on the local identifier and using the one of the local communication interfaces.

The features, functions, and advantages that have been discussed can be achieved independently in various embodiments of the invention or may be combined in yet other embodiments, further details of which can be seen with reference to the following description and drawings.

DETAILED DESCRIPTION

In various embodiments, a network and method of routing from a first node to a second node via a gateway is described. One embodiment may include a tactical embedded gateway and is described herein within the Global Information Grid (GIG) as an example for purposes of this disclosure. For example, the first node may be a remote GIG node and the second node may be a tactical node in the global network.

To automatically route data to a tactical node, the gateway detects the presence of and a local identifier for the tactical node and then acquires a global network address for the tactical node. The gateway is configured to determine a name for the tactical node and then associate the name with the global network address in an address resolution service. The gateway configures itself to subsequently receive data using the global network address and transmit the data to the tactical node using the local identifier. The gateway may later determine the tactical node is no longer present, at which time the gateway removes any configuration corresponding to the tactical node, including the gateway's routing configuration (e.g., association of the tactical node with the global address, name, and local identifier) and the name-address association in the address resolution service. The gateway includes software implementing a service-oriented architecture (SOA) to ease the process of installing and upgrading software services.

Figure 1:
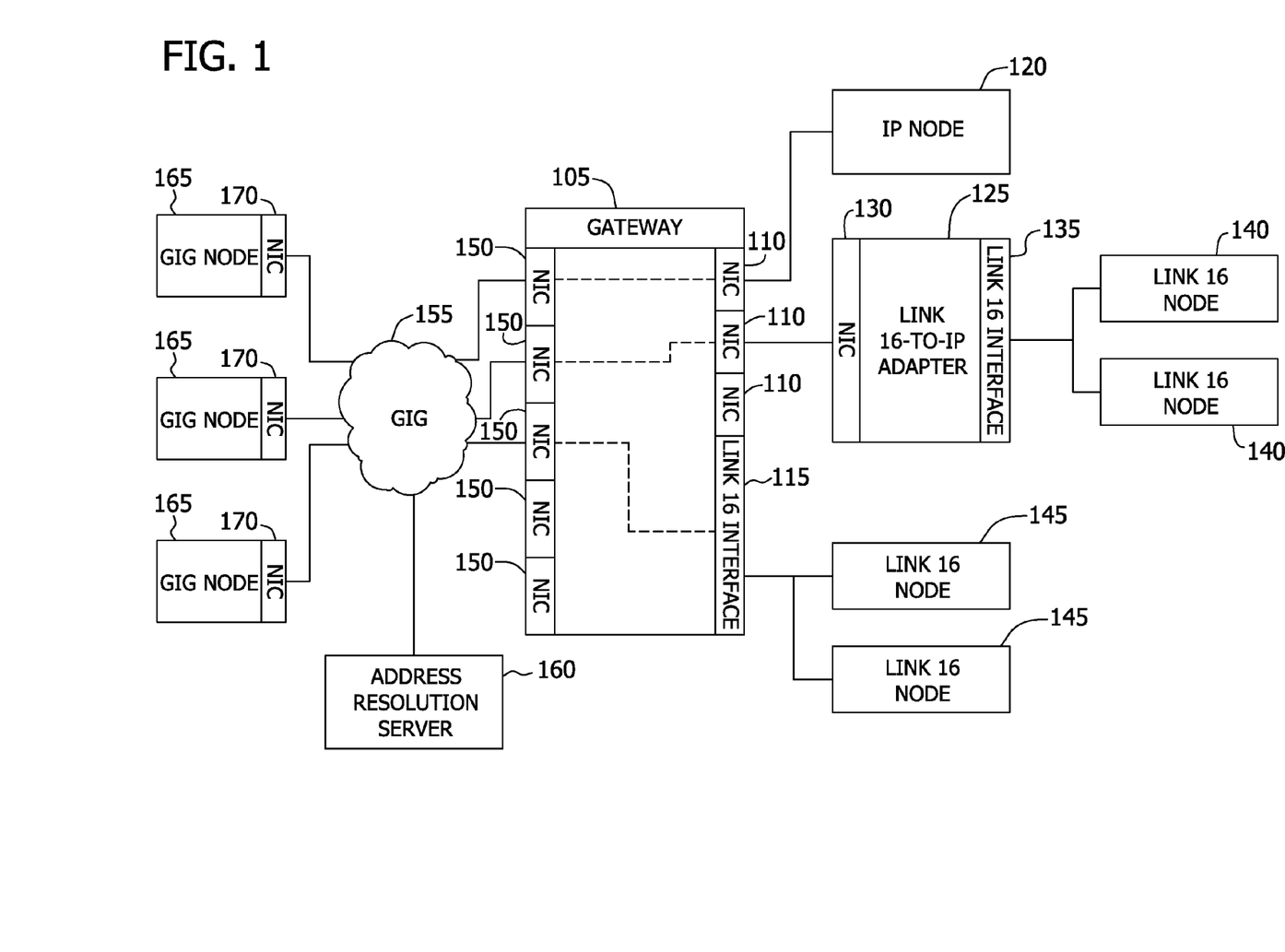
FIG. 1 is a block diagram illustrating a gateway connecting tactical nodes to a Global Information Grid (GIG) in one embodiment of the invention.

FIG. 1 is a block diagram illustrating a gateway 105 connecting tactical nodes 120, 140, and 145 to a Global Information Grid (GIG) 155. Gateway 105 includes network interface cards (NICs) 110 for communicating with nodes on a local network or local networks. A single NIC 110 may be connected to a network switch or router to communicatively attach the NIC 110 to multiple IP nodes 120. Multiple NICs 110 may also be used, for example, to connect to different local networks or to provide redundant connections to one local network. In FIG. 1, nodes on the local network include an Internet Protocol (IP) node 120 and a Link-16-to-IP adapter 125. Link-16-to-IP adapter 125 includes a NIC 130 for IP communication and a Link-16 interface 135 for communicating with Link-16 nodes 140. Link-16-to-IP adapter 125 thus provides gateway 105 an IP-based channel for communicating with Link-16 nodes 140. Gateway 105 also includes a Link-16 interface 115, which gateway 105 uses for directly communicating with Link-16 nodes 145. A gateway such as gateway 105 may employ either or both of Link-16-to-IP adapter 125 and Link-16 interface 115. Other non-IP communication interfaces suitable for communicating with tactical nodes are also contemplated.

Gateway 105 also includes NICs 150 for communicating with GIG 155. An address resolution server 160 and GIG nodes 165 are communicatively attached to GIG 155. GIG nodes 165 each include a NIC 170 for communicating with GIG 155. Address resolution server 160 maintains a registry of name-to-address associations provided by gateway 105. A GIG node 165 communicates with a tactical node 120, 140, or 145 by obtaining from address resolution server 160 an address corresponding to the name of the tactical node. The GIG node 165 transmits a message to the obtained address through GIG 155.

A communication interface such as Link-16 interface 115 or a NIC 110 or 150 may take the form of a discrete component (e.g., an expansion card) or may be integrated into one or more other hardware components (e.g., a motherboard). A NIC 110 or 150 may provide a wired and/or wireless connection to IP node 120, Link-16-to-IP adapter 125, a GIG node 165, and/or address resolution server 160. Other forms of communication interfaces suitable for communicatively attaching gateway 105, directly or indirectly, to a tactical node 120, 140, or 145, a GIG node 165, or address resolution server 160 are also contemplated.

Figure 2:
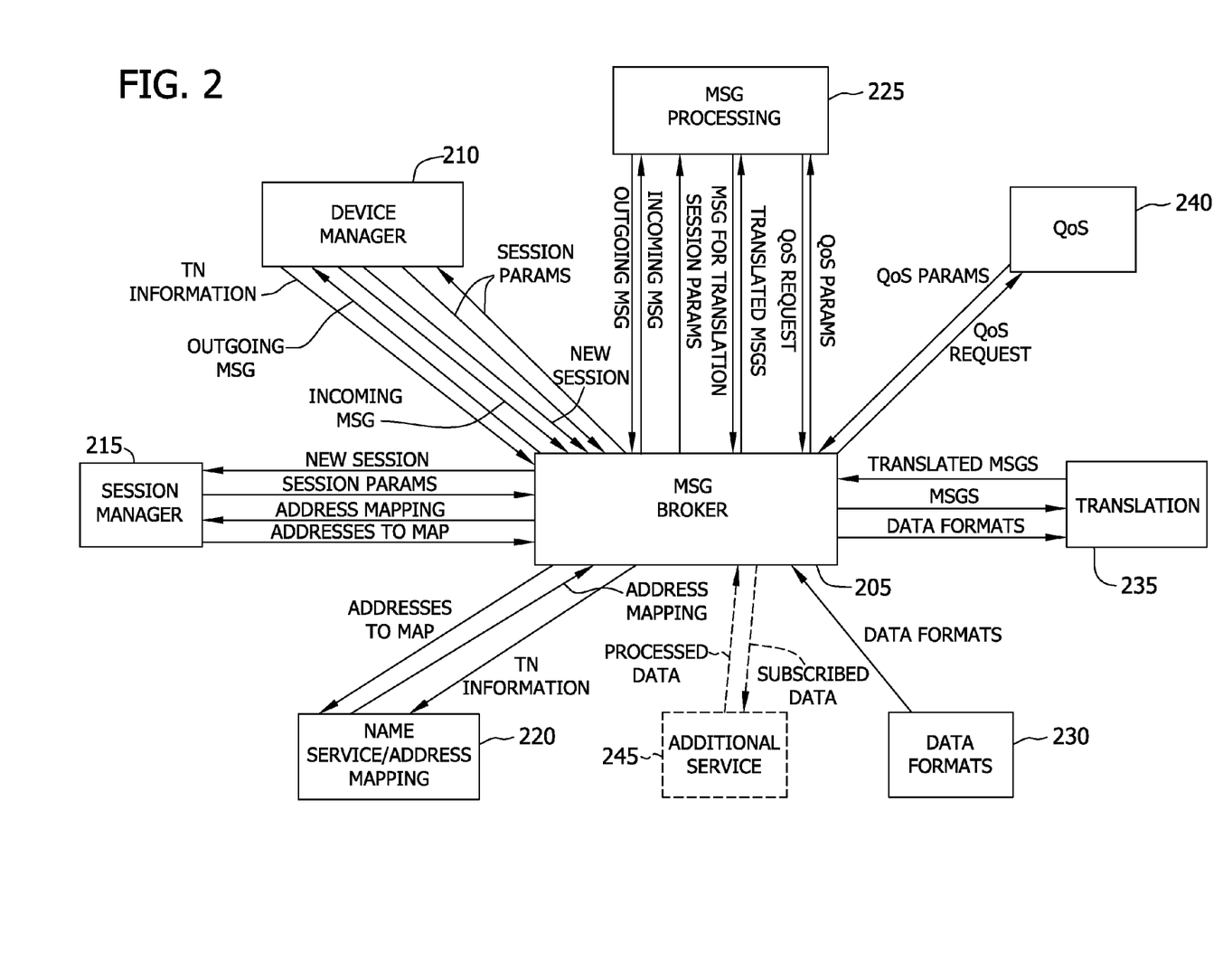
FIG. 2 is a functional component diagram illustrating operation of the gateway of FIG. 1 in one embodiment of the invention.

FIG. 2 is a functional component diagram illustrating operation of gateway 105 of FIG. 1. Gateway 105 includes a message broker 205, which routes messages between the other functional components of gateway 105. In the example described below, message broker 205 routes messages between components by providing a publish/subscribe service, in which a component subscribes for a certain type of message and receives ("consumes") all messages of the type which are published ("produced") to message broker 205. Multiple components may subscribe for a type of message and thus receive a given message (or copy of a given message) of that type. A component publishing a message requires no configuration regarding other components which have subscribed to its message. Rather, each component simply publishes messages to the publish/subscribe service of message broker 205.

Gateway 105 includes several function components in addition to message broker 205. Specifically, gateway 105 includes a device manager 210, a session manager 215, a name service/address mapping component 220, a message processing component 225, a data format component 230, a translation component 235, and a quality of service (QoS) component 240. Gateway 105 may also include any number of additional service components 245.

A component such as one of the functional components listed above may record information to and/or read information from a repository. Such a repository may take the form of a text file, a data file (e.g., containing serialized objects), or a database, such as a relational, hierarchical, or object oriented database. A repository may reside on a single physical device or be distributed among multiple physical devices.

Device manager 210 monitors a communication interface of gateway 105, such as a NIC 110 or 150, Link-16 interface 115, or any other physical, virtual, or emulated interface. Device manager 210 receives a message from the communication interface and collects header information from the message. Device manager 210 uses the header information to determine whether the message belongs to a session that is already active. Session manager 215 publishes, through message broker 205, session information to which device manager 210 subscribes. If a session is already in place, device manager 210 ensures that other components have access to session parameters needed for processing the incoming message by publishing those session parameters through message broker 205. If the message is the first of a new session being established, device manager 210 publishes the relevant information, including session parameters, regarding this new session to message broker 205. Message broker 205 provides the session information to session manager 215, which has subscribed to such information. Device manager 210 publishes the incoming message to message broker 205 for consumption by any other module which has subscribed to such messages.

Message processing component 225 coordinates processing of the incoming message from device manager 210. Message processing component 225 subscribes to receive incoming messages from device manager 210 and extracts from an incoming message selected information such as message headers and message metadata, which may include QoS markings, a message type or format, and/or a source indicator, for example. Message processing component 225 publishes the selected information to message broker 205. Other components, such as translation component 235, QoS component 240, and additional service component 245 subscribe to selected information corresponding to services they provide. For example, QoS component 240 subscribes to information about QoS markings in a message.

QoS may be used to ensure high quality service for the transmission of data between a tactical network and GIG 155. The IPv4 and IPv6 protocols provide users with end-to-end QoS in the form of Differentiated Services (DiffServ), such as defined by Internet Engineering Task Force (IETF) Request for Comments (RFC) 2474, with Explicit Congestion Notification (ECN), such as defined by IETF RFC 3168.

Some networks are physically secured (e.g., by passing network cables through pressurized conduit) and are referred to as "red" networks. Data may be safely transmitted within a red network in unencrypted or "plain text" form. Other networks, known as "black" networks, provide no guarantee of physical security and thus require that data be transmitted in encrypted or "cipher text" form. Generally, data passing between red network and a black network is encrypted through HAIPE. QoS information, however, may be allowed to bypass HAIPE in the red-to-black direction, the black-to-red direction, or both. The combination of these two end-to-end QoS network services would be used by a red side SOA-based gateway QoS network service to provide end-to-end QoS provisioning support to IP waveforms. However, QoS provisioning for non-IP waveforms may require the use of available native mechanisms or the deployment of an overlay QoS provisioning mechanism for the particular non-IP waveform.

QoS provisioning in gateway 105 is achieved by forwarding traffic between IP waveforms and tactical non-IP waveforms while following any gateway-configured policy mappings that may apply. In other words, IP traffic may be forwarded with the same packet markings or with new markings if the gateway-configured policy requires a change. Also based on gateway-configured policies, IP traffic being forwarded using a tactical communication format (e.g., Link-16) may have IP packet markings reflected in a prioritization scheme corresponding to the tactical communication format. The same can be done when forwarding from a tactical communication format to an IP network. In these scenarios, packet markings may be modified at gateway 105 according to gateway-configured policies. Where no gateway-configured policies apply, gateway 105 may forward traffic with the existing packet markings. Gateway 105 may schedule packets using QoS component 240, but for IP packets, additional scheduling may be performed using a kernel mode network traffic controller. The kernel mode network traffic controller scheduling may be handled by the operating system of gateway 105 or in dedicated hardware of gateway 105.

QoS management for non-IP waveforms may be handled as an overlay network service using QoS component 240. For example, gateway 105 may discard ("drop") packets at QoS component 240 when a Link-16 traffic rate exceeds the limits imposed by a policy of gateway 105. However, this capability is independent of any packet dropping performed at the kernel mode traffic controller, which is applicable to IP traffic. Gateway 105 may also provide queue and congestion management at QoS component 240 for Link-16 traffic, independent of any queue and congestion management performed at the kernel mode traffic controller for IP traffic. In addition, gateway 105 may limit the transmission rate of packets at QoS component 240 for non-IP waveforms such as Link-16, while the transmission rate control for IP traffic may be performed at the kernel mode traffic controller. Mapping of QoS mechanisms are specific to the traffic being forwarded from an IP network to a non-IP (e.g., Link-16) network, and vice-versa. This mapping may be based on policies configured at gateway 105.

After it processes information corresponding to a message, each subscribing component indicates to message broker 205 that its processing is complete. When all subscribing components have indicated such completion, message broker 205 generates an outgoing message, to which device manager 210 subscribes. Device manager 210 transmits the outgoing message using an appropriate communication interface, which may be a NIC 110 or 150, Link-16 interface 115, an upper layer socket if this message is directed to gateway 105 itself, or any other physical, virtual, or emulated interface.

Device manager 210 is also responsible for maintaining a record of tactical nodes 120, 140 and 145 connected to gateway 105 in a repository. A record of a tactical node includes at least enough information to identify and communicate with the tactical node. Additional information may also be recorded. For example, a Link-16 node 140 or 145 transmits Precise Participant Location and Identification (PPLI) messages, reporting its current status, including its location and identification information. This information can be used by device manager 210 to track all active Link-16 nodes and can be published to message broker 205 such that other components or nodes can use it. Information about IP node 120 may be derived from routing tables maintained using the underlying routing protocol or from routing hardware and can be shared with other components or nodes in the same fashion. In particular, name service/address mapping component 220 subscribes to the tactical node information so that it may dynamically update its name service and address mapping repository as tactical nodes join or leave the local network.

Session manager 215 uses a repository to maintain a record of all communication sessions active in gateway 105. Session manager 215 records information such as the address (global and/or local) of each node participating in the session, the message data types used on the networks involved, the outgoing communication interface, etc. Session manager 215 subscribes with message broker 205 to messages regarding new sessions. Device manager 210 publishes a new session message when it determines an incoming message does not belong to any of the active sessions. The new session message includes header information and any other relevant parameters. In order to obtain address mapping for the network addresses involved in each session, session manager 215 publishes addresses that require translation (or mapping) for use in other networks. Name service/address mapping component 220 subscribes to this information and publishes corresponding address mappings in response. Again through a subscription, session manager 215 has access to the address mappings that will be used in its record of sessions. Session manager 215 also publishes its record of sessions for use by other components, in particular device manager 210 and message processing component 225. Device manager 210 uses the record of sessions to determine if an incoming message is already associated with an active session. Message processing component 225 uses the record of sessions to generate the outgoing message, which requires awareness of which source and destination addresses to use, which communication interface to use for transmission, whether translation is needed, whether QoS markings are needed, and any other information relevant to message transmission.

Message processing component 225 is the main module in gateway 105. It is responsible for gathering all the necessary information to assemble an outgoing message and publish it so that device manager 210 can transmit the message using an appropriate interface. Message processing component 225 subscribes to incoming messages from device manager 210 using message broker 205. Message processing component 225 evaluates an incoming message and identifies information regarding the session to which the message belongs. The session information is obtained through another service subscription at message broker 205. This service provides session data published by session manager 215. Message processing component 225 uses the session information to determine whether the message should be translated (for example, from IP to a tactical communication format such as Link-16 or vice-versa), the source and destination addresses for the outgoing message, which communication interface to use for transmitting the message, what QoS markings or equivalent QoS strategy should be used, whether the message or information related to the message should be processed by additional service component 245, and any other information relevant to message transmission.

If message processing component 225 determines a message should be translated, it publishes the message to a translation service at message broker 205 such that translation module 235, which has subscribed for translation messages, receives the message, translates the message as requested, and publishes the translated message back to message broker 205 using a different service. The translated message is thus made available to subscribers. In this case, message processing component 225 is the only subscriber and will receive the translated message for further processing.

Message processing component 225 publishes QoS parameters, which may include header information from the incoming message, and session parameters such as the outgoing communication interface. This data is used by QoS component 240, which subscribes to the service, to determine what type of QoS markings or QoS strategies should be used in transmitting the outgoing message. The information is again published back to message broker 205 and, through a subscription, can be retrieved by message processing component 225.

Message processing component 225 assembles the outgoing message, whether it requires translation or not, and includes the new header information. The header includes the appropriate source and destination addresses and any other information required by the outgoing network, such as QoS markings. The outgoing message is again published at message broker 205 and provided via a subscription to device manager 210 for transmission. After translation, the incoming message may be segmented into multiple messages, in which case message processing component 225 simply generates multiple outgoing messages and publishes the messages to message broker 205 as before. The messages are received by the device manager 210, which transmits the messages one at a time.

Name service/address mapping component 220 provides information regarding addresses associated with names such as domain names as well as address mappings between two networks (i.e., a global address and local address associated with a tactical node 120, 140, or 145). Gateway 105 associates tactical nodes with global addresses used in GIG 155. Whenever a tactical node 120, 140, or 145 is detected by gateway 105, gateway 105 associates it with a global address, such as from a local pool of global addresses. The global address is used as the source address for outgoing messages forwarded by gateway 105 from tactical node 120, 140, or 145 to a GIG node 165 through GIG 155. The global address is also used as the destination for incoming messages from a GIG node 165 directed to a tactical node 120, 140, or 145.

Gateway 105 may also route data between tactical nodes 120, 140, and 145. For example, IP node 120 may transmit a message directed to the name or the global address of a Link-16 node 145. Gateway 105 determines that the name or global address is associated with the Link-16 node 145 and routes the message to the Link-16 node 145 using Link-16 interface 115, rather than routing the message through GIG 155 using a NIC 150. Directly routing messages between tactical nodes 120, 140, and 145 reduces latency in communication and avoids introducing unnecessary traffic to GIG 155. Gateway 105 may thus route data between tactical nodes 120, 140, and 145 that reside on different subnets or that communicate using different formats and/or waveforms.

Device manager 210 provides a record of active tactical nodes 120, 140, and 145 to name service/address mapping component 220. The record of nodes may be derived from PPLI messages received from Link-16 nodes, by routing table entries provided by the IP routing protocol or routing hardware, or by any other suitable node discovery technique. Device manager 210 publishes the record of nodes at message broker 205, and name service/address mapping component 220 subscribes to that service. Name service/address mapping component 220 therefore receives the record of nodes whenever it is updated by device manager 210. If a new node becomes active, name service/address mapping component 220 selects an unused global address (e.g., a free address in a local pool) and associates it with the node, keeping a record of the address-node association (e.g., in a local address mapping repository). So that GIG nodes 165 may communicate with the tactical node, name service/address mapping component 220 may determine a name of the tactical node and publish an association of the name to the global address to address resolution server 160.

Address resolution server 160 may take the form of a dynamic domain name system (DDNS) server or any other form suitable for providing a global address to a GIG node 165 based on a name. Name service/address mapping component 220 may also or instead make available to GIG nodes 165 an address resolution service providing global addresses for tactical nodes attached to gateway 105. Name service/address mapping component 220 may include such an address resolution service or interact with such an address resolution service hosted on gateway 105.

If a node that was previously active becomes inactive, name service/address mapping component 220 removes the corresponding address-node association and frees the corresponding global address (e.g., by returning the address to the pool of available addresses). The freed address may now be associated with another node.

Name service/address mapping component 220 publishes address mapping information to message broker 205 so that other components can subscribe to it. Name service/address mapping component 220 may also provide an address lookup service such as domain name system (DNS) services in a similar fashion. Name service/address mapping component 220 may function as a simple proxy between services on gateway 105 and another name service attached to GIG 155, such as provided by address resolution server 160, or may also maintain a local cache of name-address associations. The cache may be populated statically or based on results of address lookups for which name service/address mapping component 220 functions as a proxy. The cache may also be populated as tactical nodes 120, 140, and 145 are detected by gateway 105 and associated with names. Name service/address mapping component 220 may thus provide to tactical nodes 120, 140, and 145 an address lookup service including global addresses of both GIG nodes 165 and other tactical nodes 120, 140, and 145.

Name service and address mapping information published by name service/address mapping component 220 may be accessed by other modules in gateway 105 subscribing to the service, in particular by session manager 215, which uses the information in its record of sessions. Name service/address mapping component 220 provides name and address mapping for tactical nodes 120, 140, and 145. It may also provide name and/or address information corresponding to GIG nodes 165. If name service/address mapping component 220 provides only tactical node information or cannot provide information for a particular GIG node 165, a request for information corresponding to the GIG node 165 may be sent to an address resolution server 160 through GIG 155. As with any other service brokered by message broker 205, the name and/or address service is accessible to any other component in gateway 105.

Data format component 230 provides a repository of message/data formats for various communication standards supported by gateway 105. Data format component 230 stores and maintains details regarding message formats for each supported standard in this repository such that the information can be shared with any other component in gateway 105. Adding support for a new standard requires simply adding information regarding a corresponding message format to the repository of data format component 230. Message formats may be pre-loaded in data format component 230. Data format component 230 publishes the formats in its repository at message broker 205 such that other components have access to the formats through subscriptions. As new message formats are added or existing formats are modified, data format component 230 publishes the new or updated format at message broker 205. For example, translation component 235 may subscribe to message format information to enable proper message translation between a Link-16 node 140 or 145 and a GIG node 165. Message/data format descriptions ("descriptors") are designed such that any message type can be translated to any other message type by translation component 235. In other words, translation component 235 reads an incoming message, identifies all fields based on a first message format description, and composes a translated message containing all identified fields using a second message format description.

Translation component 235 subscribes to a service at message broker 205 to which messages requiring translation are published. Translation module 235 reads a message from the service, compares the message with its data format descriptor, and assembles a new message carrying the same payload and equivalent header information, but in accordance with a data format descriptor corresponding to the destination of the message. The data format descriptor is provided by data format component 230, which publishes and maintains data format descriptors for all technologies supported by gateway 105.

As a subscriber to the data format service, translation component 235 receives data format descriptors from message broker 205 and uses an appropriate format during the translation process. The translation process depends only on the data format descriptors, thus facilitating the introduction of support for new communication standards. Because different message formats may have different payload capacities, translation of one message/packet may result in one or more translated messages/packets. Such segmentation of messages does not adversely affect the operation of gateway 105, however. Translation component 235 simply publishes as many messages as required to message broker 205, and all published messages are provided to the subscribers independently. The subscribers may process each one of the messages as if they were replications of the original message.

QoS component 240 assigns QoS markings to outgoing messages based on, for example, the QoS markings of incoming messages, local policies, and/or the outgoing communication interface and its current traffic load. Whether or not messages are translated between two different technologies (e.g., IP and a tactical communication format such as Link-16), QoS component 240 maps QoS markings based on policies defined at gateway 105. These policies may include a direct copy of the existing QoS markings when forwarding from an IP network to another IP network, may include changes to the QoS markings even in an IP-to-IP case, and may include details on how to extend IP QoS markings to a Link-16 network. The same will hold true for any future technology supported by gateway 105. For the IP-to-Link-16 and Link-16-to-IP cases, IP QoS code points may be mapped to Link-16 Network Participation Groups (NPGs) and vice versa, based on pre-defined policies. QoS component 240 subscribes to a service providing information about QoS parameters corresponding to incoming messages and/or other selected session parameters (e.g., an outgoing interface) to determine the QoS parameters to assign to corresponding outgoing messages. Message processing component 225 publishes incoming QoS parameters and session parameters at message broker 205. Message processing component 225 also subscribes to the outgoing QoS parameters published by QoS module 240.

Because gateway 105 employs a publish/subscribe message propagation framework, other components such as additional service component 245 may be included in gateway 105 to provide additional features. For example, additional components may provide device interfaces, platform interfaces, voice services such as voice-to-text conversion, applications, application services, network backbone infrastructure services, security services, and/or management services such as gateway management, tactical node management, and/or network management, though other services are also contemplated.

Components may be installed or updated on the gateway by a user at the gateway or remotely. For example, a new or updated component may be distributed through a global network such as GIG 155 by a remote node such as a GIG node 165. A component may also be distributed to a gateway by a tactical node. For example, a tactical node which is designed to communicate using a new communication standard may use an existing, supported communication standard to install on the gateway a component supporting the new standard.

Figure 3:
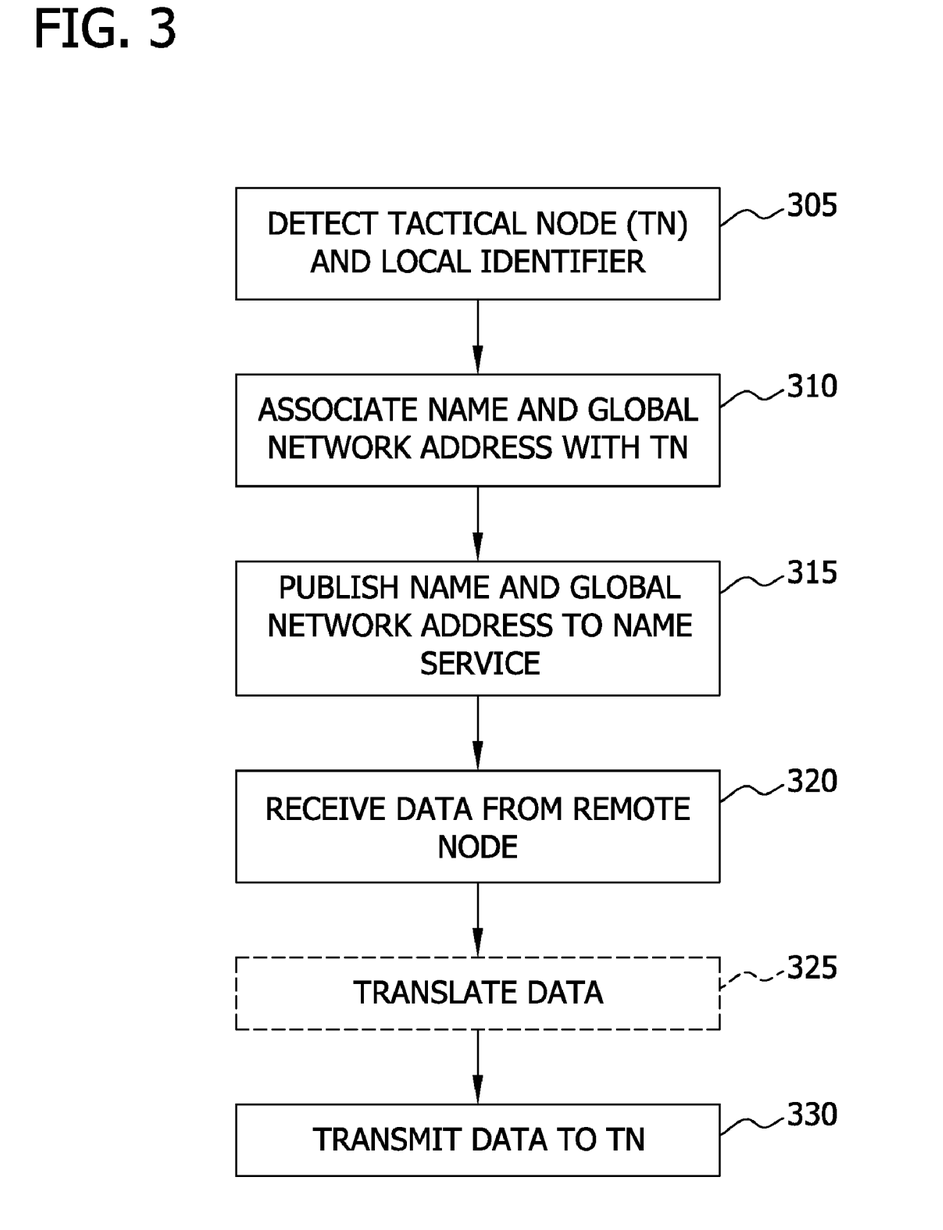
FIG. 3 is a flowchart illustrating an exemplary process for routing data from a remote node to a tactical node via a gateway such as the gateway of FIG. 1.

FIG. 3 is a flowchart illustrating an exemplary process for routing data from a remote node to a tactical node via a gateway such as gateway 105 of FIG. 1. The process includes detecting 305 a tactical node and a local identifier of the tactical node. The tactical node is communicatively attached to the gateway. For example, the tactical node may communicate with a local communication interface of the gateway, and the tactical node may be detected based on such communication. The local identifier may be a hardware identifier such as a media access control (MAC) address, a local network address such as an IP address, or any other device suitable for indicating a particular tactical node.

The process also includes associating 310 a name and a global network address with the tactical node. In some embodiments, a global address is obtained from an address assignment server such as a dynamic host configuration protocol (DHCP) server and associated with the tactical node. An address may also be selected from a collection or "pool" of addresses allocated to the gateway. For example, a range of addresses or a subnet may be allocated to the gateway.

The process further includes publishing 315 the name and the global network address of the tactical node to a name service, which may, for example, be hosted on an address resolution server. The remote node acquires the global network address of the tactical node from the name service based on the name of the tactical node. By performing these portions of the process, the gateway registers the tactical node for communication with other devices such as the remote node.

The process also includes receiving 320 data from the remote node that is addressed to the global network address, optionally translating 325 the data, and transmitting 330 the data to the tactical node based on the local identifier. Data may be transmitted 330 to the tactical node using a local communication interface of the gateway. For example, if the local identifier is a local network address, the data may be transmitted 330 to the tactical node by transmitting the data to the local network address using a network interface card or network adapter.

A tactical node may be detected 305 in several ways. For example, the tactical node may transmit a message to the gateway. The message may be a "ping" message, a dynamic host configuration protocol (DHCP) request, a service request specially crafted for interacting with the gateway, or any other message suitable for informing the gateway that the tactical node is communicatively attached. The message may include the local identifier of the tactical node, or the gateway may transmit a request for the local identifier after the tactical node informs the gateway of its presence.

The name for a tactical node may be provided by the node itself, such as in a service request specially crafted for interacting with the gateway. The tactical node may provide a name in response to a request from the gateway. In other cases, the gateway may determine a name for the tactical node by requesting a name from a name provider or name service (e.g., hosted on a remote server). For example, the gateway may specify to a name provider the local identifier of the tactical node and receive in response a name. The gateway may obtain a name from a name provider based on other or additional information related to the tactical node, including a node type of the tactical node, a location of the tactical node, a location of the gateway, and/or an address of the gateway, though other information is also contemplated. Similarly, a name may be determined or generated based on the same types of information related to the tactical node. A gateway may employ multiple naming strategies. For example, a gateway may request a name from a name provider based on the local identifier of the tactical node. If no name is returned by the name provider, the gateway may generate a name.

In some embodiments, data is received from the remote node using a first communication standard and transmitted to the tactical node using a second communication standard. For example, the first communication standard may be IP version 4 (IPv4), IP version 6 (IPv6), or any standard suitable for communicating with devices such as the remote node. The second communication standard may be a version of IP different from the first communication standard, Link-11, Link-16, Link-22, Single Channel Ground-Air Radio System (SIN-CGARS), Enhanced Position Locating Reporting System (EPLRS), Near Term Digital Radio (NTDR), Have Quick (HQ), Land Mobile Radio (LMR), Multifunction Advanced Data Link (MADL), Situation Awareness Data Link (SADL), or any standard (including IP and non-IP waveforms) suitable for communicating with the tactical node.

Data may be translated 325 before transmission to the tactical node from a first data format corresponding to the remote node to a second data format corresponding to the tactical node. Translation may prove especially valuable or necessary if, for example, the remote node communicates using IP, and the tactical node communicates using a tactical communication format such as Link-16.

QoS may be implemented by defining a QoS policy for the gateway, defining a QoS policy for a remote node or tactical node, defining a QoS policy for a communication standard or communication interface, and/or detecting a QoS policy based on the data received from the remote node. QoS markings corresponding to the defined or detected QoS policy may be added to data sent to the tactical node.

In some cases, a tactical node initiates communication with a remote node. The gateway is further programmed to receive from the tactical node (e.g., using a local communication interface) a local message and transmit the local message to the remote node. If the remote node and the tactical node communicate using different communication standards, this process may further include translating the local message from one format corresponding to the tactical node to another format corresponding to the remote node to create a translated message, in which case the translated message is transmitted to the remote node.

A tactical node may cease communicating with a gateway. A gateway may therefore be programmed to perform a de-registration process. The process includes detecting an absence of communicative attachment to the tactical node. For example, the gateway may detect a wired or wireless link has been severed, or the gateway may be unable to receive a response from the tactical node through a wired or wireless link. The process also includes disassociating the global network address from the tactical node and removing the association of the name to the global network address (e.g., using the address resolution server). The process may further include terminating and/or closing open connections or sessions related to the tactical node.

In some cases, a tactical node may become communicatively detached from one gateway and establish communicative attachment to another gateway. The first gateway de-registers the tactical node, and the second gateway registers the tactical node, thus subjecting the tactical node to a loss of communication with the global network for as short a duration as possible.

Figure 4A:
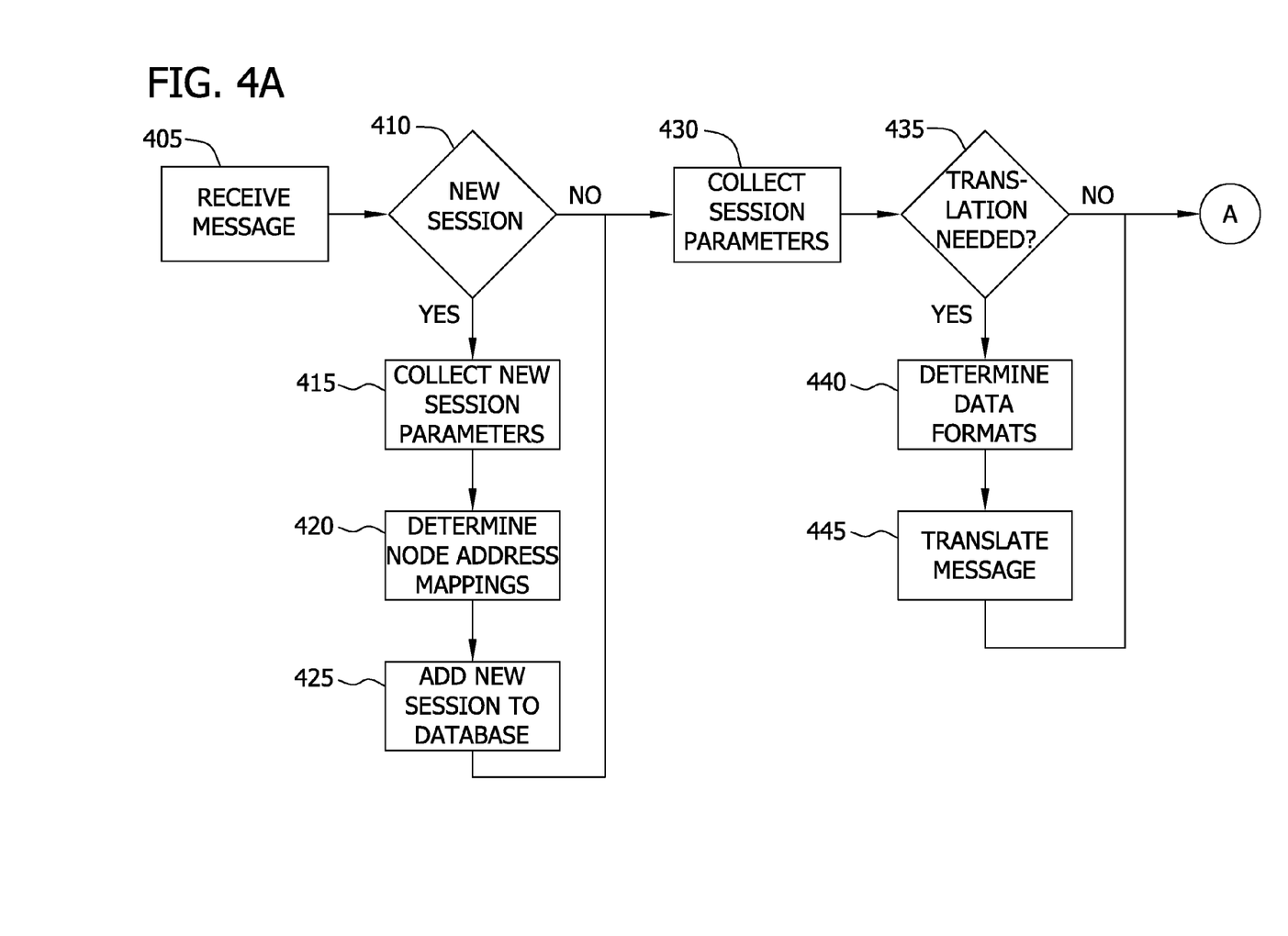
FIGS. 4A and 4B are a flowchart illustrating an exemplary process performed by the functional components of FIG. 2.
Figure 4B:
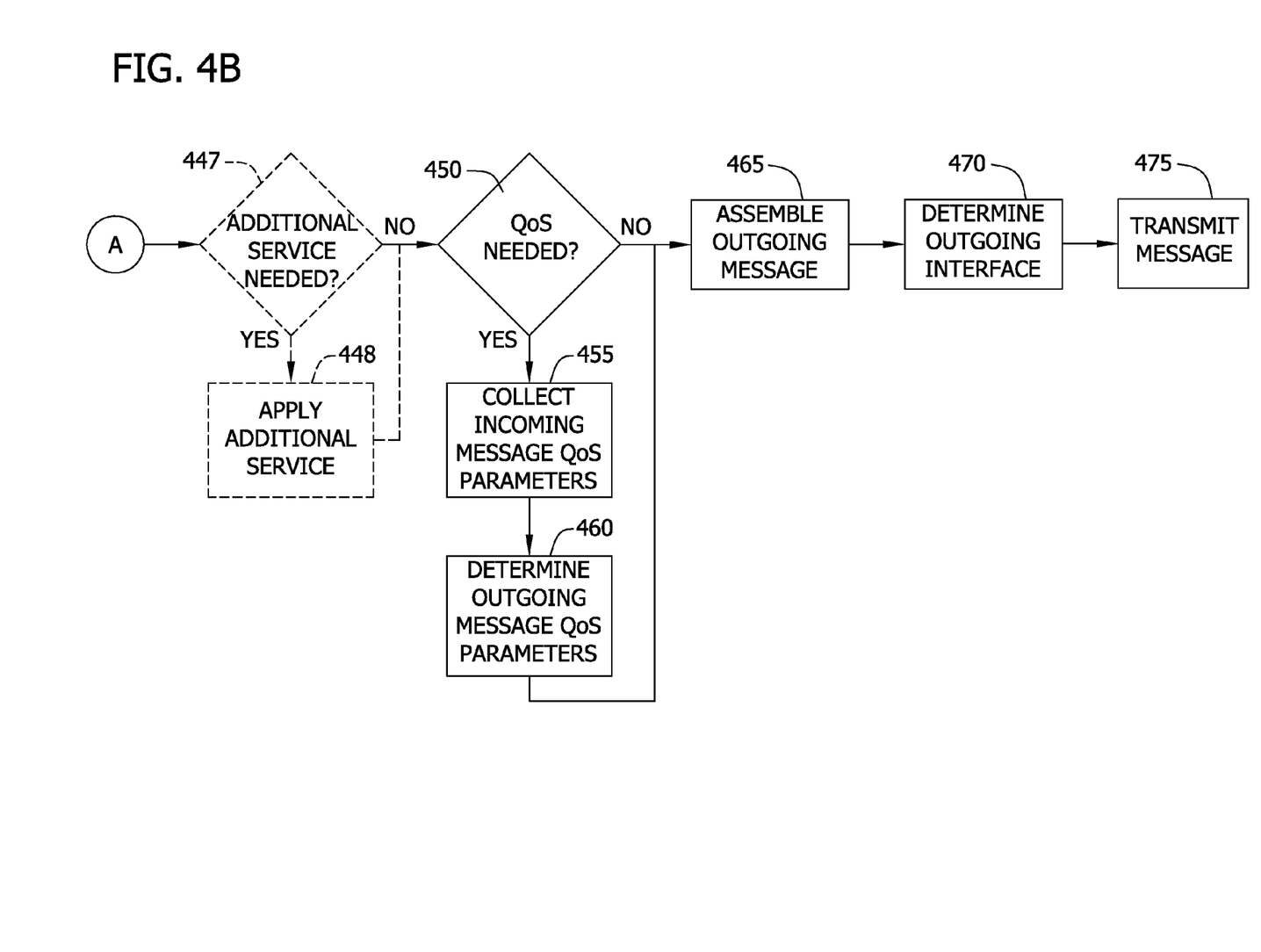

FIGS. 4A and 4B are a flowchart illustrating an exemplary process performed by the functional components of FIG. 2. The illustration provides an example of how an incoming message may trigger the stages of processing performed by the various components involved.

Device manager 210 receives 405 a message using the incoming interface and determines 410 whether the message belongs to an active session. This information is available to device manager 210 through a subscription that collects active session information published by session manager 215. If a corresponding active session is not present, device manager 210 publishes information related to the new session so that session manager 215 can, through its subscription, collect 415 session information. When processing the new session, session manager 215 determines 420 information related to address mappings for the nodes involved. This information is provided, again using the publish/subscribe framework, by name service/address mapping component 220. When the information is collected, session manager 215 adds 425 the session to its record of sessions and publishes the session information to make it available to other components.

If session parameters are accounted for, device manager 210 publishes the incoming message, which is collected by a subscriber, message processing component 225. Message processing component 225 collects 430 the session information published by session manager 215 and uses this information to determine 435 whether a message requires translation. If so, the message is published to message broker 205 and received by translation component 235. In order to translate the message, translation component 235 has access to supported data formats, which are published by data format component 230. Translation component 235 determines 440 which formats to use in translating the message and proceeds to translate 445 the message (possibly into multiple messages/packets) and publish the translated message to message broker 205.

An additional service component such as additional service component 245 may subscribe to receive the translated message from message broker 205. Additional service component 245 receives the message and determines 447 whether the service it provides is needed for the message. If so, additional service component 245 processes the message by applying 448 its service and publishes the processed message to message broker 205. While FIGS. 4A and 4B show the additional service applied between translation and QoS processing, an additional service may be applied at any point after receiving 405 the incoming message.

Message processing component 225 receives the message, which has been translated by translation component 235 and optionally processed by additional service component 245, through a subscription and determines 450 whether the session requires QoS accommodation. If so, message processing component 225 publishes a request for QoS parameters. The request includes QoS markings from the incoming message and possibly additional information such as the outgoing interface. QoS component 240 receives the request through a subscription, collects 455 the information in the request, and determines 460 which QoS markings and/or other parameters should be associated with the outgoing message. QoS component 240 publishes this information to message broker 205, from which it is received by message processing component 225.

Message processing component 225 assembles 465 an outgoing message, taking into account any translation and QoS markings/parameters and publishes the outgoing message to message broker 205. Device manager 210 receives the message that is now ready to be transmitted. Device manager 210 module determines 470 an appropriate outgoing interface (or, if appropriate, an upper layer socket) for the transmission and proceeds to transmit 475 the message accordingly.

A gateway such as described herein acts an intermediary or proxy between a local network of tactical nodes and a global network. Such a gateway may, therefore, enhance security of both the local network and the global network. For example, the gateway may allow into the local network only data directed to a tactical node communicatively attached to the gateway. Conversely, the gateway may block some or all traffic originating in the local network. For data transmitted in either direction, the gateway may maintain and apply a collection of nodes from which data should be refused (a "blacklist") and/or a collection of nodes from which data should be accepted (a "whitelist"). Other security rules are contemplated, as well.

A group of gateways may be deployed to a locale. Deploying a group of gateways increases the capacity for tactical nodes. The gateways may also be programmed to achieve load balancing and redundancy. For example, each gateway in a group may communicate messages, records, and/or repositories to the other gateways in the group. If a first gateway in a group fails, a second gateway in the group may establish communicative attachment to a tactical node that was attached to the gateway that failed. Because the second gateway received information about the tactical node and any communication sessions related to the tactical node before the first gateway failed, the second gateway can resume those communication sessions with little or no interruption in service.

In some embodiments, a gateway is embedded or installed in a mobile unit such as a wheeled vehicle. A group of such gateways may collectively form a mobile ad hoc network (MANET, a/k/a mobile mesh network).

The subject matter of the present disclosure is described with specificity herein to meet statutory requirements. However, the description itself is not intended to limit the scope of this patent. Rather, it has been contemplated that the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

This written description uses examples to disclose the described embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for routing data from a first node to a second node via a gateway, the method comprising:
    receiving, by the gateway, data from the first node that is addressed to the global network address associated with the second node;
    determining if the received data is associated with an active session;
    detecting at the gateway the second node and a local identifier of the second node, wherein the second node is local to and communicatively attached to the gateway;
    associating, by the gateway, a name and a global network address with the second node;
    configuring, by the gateway, a routing configuration associating the global network address with the local identifier of the second node;
    publishing the name and the global network address of the second node to a name service from which the first node acquires the global network address based on the name if the received data is not associated with the active session;
    transmitting, by the gateway, the data to the second node using the local identifier that is associated with the global network address in the routing configuration; and
    in response to detecting an absence of communicative attachment to the second node by the gateway, disassociating by the gateway the global network address from the second node and removing by the gateway the name and the global network address from the name service.

2. The method of claim 1, wherein:
    receiving data from the first node comprises receiving the data using a first communication standard; and
    transmitting the data to the second node comprises transmitting the data using a second communication standard.

3. The method of claim 2, wherein receiving the data using a first communication standard comprises receiving the data using Internet Protocol version 4 (Ipv4) or Internet Protocol version 6 (Ipv6).

4. The method of claim 2, wherein transmitting the data using a second communication standard comprises transmitting the data using at least one of Link-11, Link-16, and Link-22.

5. The method of claim 1, wherein detecting a local identifier comprises detecting a local network address, and wherein transmitting the data to the second node based on the local identifier comprises transmitting the data to the local network address of the second node.

6. The method of claim 1, wherein detecting the second node comprises receiving a message from the second node.

7. The method of claim 1, wherein associating a name with the second node comprises associating a name received from the second node with the second node.

8. The method of claim 1, wherein associating a name with the second node comprises associating a name obtained from a name provider with the second node.

9. The method of claim 1, further comprising determining a name for the second node based on one or more of the following: the local identifier, a node type of the second node, a location of the second node, a location of the gateway, an address of the gateway, and a name of the gateway, and wherein the associating a name with the second node comprises associating the determined name with the second node.

10. The method of claim 1, further comprising translating the data from a first data format corresponding to the first node to a second data format corresponding to the second node.

11. The method of claim 1, further comprising detecting a quality of service (QoS) policy based on the data received from the first node, and wherein the data is transmitted to the second node based on the QoS policy.

12. A global network comprising:
    a first node communicatively attached to a communication medium;

an address resolution server communicatively attached to the communication medium; and at least one gateway communicatively attached to the communication medium and comprising a plurality of local communication interfaces, the gateway programmed to:
  receive from the first node a remote message addressed to the global network address associated with the second node;
  determine if the remote message is associated with an active session;
  detect a second node that is local to the gateway and a local identifier of the second node using one of the local communication interfaces;
  associate a name and a global network address with the second node;
  configure a routing configuration associating the global network address with the local identifier of the second node;
  publish an association of the name to the global network address using the address resolution server, wherein the first node acquires the global network address from the address resolution server based on the name if the remote message is not associated with the active session;
  transmit the remote message to the second node using the local identifier that is associated with the global network address in the routing configuration and using the one of the local communication interfaces; and
  in response to detecting an absence of communicative attachment to the second node, disassociate the global network address from the second node and remove the association of the name to the global network address using the address resolution server.

13. The global network of claim 12, further comprising an address assignment server communicatively attached to the communication medium, and wherein the at least one gateway associates a global network address with the second node by:
  obtaining an available address from the address assignment server; and
  associating the obtained available address with the second node.

14. The global network of claim 12, wherein:
  the at least one gateway is further programmed to translate the remote message from a first format corresponding to the first node to a second format corresponding to the second node to create a translated message; and
  transmitting the remote message to the second node comprises transmitting the translated message to the second node.

15. The global network of claim 14, wherein the at least one gateway is further programmed to:
  receive from the second node using the one of the local communication interfaces a local message;
  translate the local message from the second format to the first format to create a translated message; and
  transmit the translated message to the first node.

16. The global network of claim 12, wherein:
  the at least one gateway is further programmed to detect a quality of service (QoS) policy based on the remote message received from the first node; and
  the at least one gateway transmits the remote message to the second node based on the QoS policy.

17. The global network of claim 16, wherein to transmit the remote message to the second node based on the QoS policy, the at least one gateway is programmed to assign a QoS marking to the remote message based on the QoS policy.

18. The global network of claim 12, wherein the at least one gateway is further programmed to:
  receive from the second node using the one of the local communication interfaces a local message; and
  transmit the local message to the first node.

19. The global network of claim 12, further comprising a name provider server communicatively attached to the communication medium, and wherein the at least one gateway is programmed to associate a name with the second node by:
  obtaining from the name provider server a name for the second node; and
  associating the obtained name with the second node.

20. A gateway for routing data from a first node to a second node, the gateway comprising:
  a first communication interface for communicating with the first node and an address resolution server via a network, wherein the first node and the address resolution server are remote to the gateway; and
  a second communication interface configured to detect the second node and a local identifier of the second node, wherein the second node is local to the gateway, and the gateway is programmed to:
    receive from the first node, using the first communication interface, a remote message addressed to the global network address associated with the second node;
    determine if the remote message is associated with an active session;
    associate a name and a global network address with the second node;
    configure a routing configuration associating the global network address with the local identifier of the second node;
    publish an association of the name to the global network address using the address resolution server, wherein the first node acquires the global network address from the address resolution server based on the name if the remote message is not associated with the active session;
    transmit the remote message to the second node using the local identifier that is associated with the global network address in the routing configuration and using the second communication interface; and
    in response to detecting an absence of communicative attachment to the second node, disassociate the global network address from the second node and remove the association of the name to the global network address using the address resolution server.

* * * * *